United States Patent
Vafai et al.

(10) Patent No.: US 12,445,375 B2
(45) Date of Patent: Oct. 14, 2025

(54) DETERMINING APPLICABILITY OF ROUTING CONTROL FUNCTION AT POINT OF APPLICATION

(71) Applicant: Arista Networks, Inc., Santa Clara, CA (US)

(72) Inventors: Keon M. Vafai, Milpitas, CA (US); James Doherty, Dublin (IE); Matthieu Loriol, Vancouver (CA)

(73) Assignee: ARISTA NETWORKS, INC., Santa Clara, CA (US)

( * ) Notice: Subject to any disclaimer, the term of this patent is extended or adjusted under 35 U.S.C. 154(b) by 50 days.

(21) Appl. No.: 18/602,831

(22) Filed: Mar. 12, 2024

(65) Prior Publication Data
US 2025/0293973 A1    Sep. 18, 2025

(51) Int. Cl.
*H04L 45/02*  (2022.01)
*H04L 45/42*  (2022.01)

(52) U.S. Cl.
CPC .............. *H04L 45/42* (2013.01); *H04L 45/04* (2013.01)

(58) Field of Classification Search
CPC .......... H04L 45/04; H04L 45/42; H04L 45/44
See application file for complete search history.

(56) References Cited

U.S. PATENT DOCUMENTS

| | | | |
|---|---|---|---|
| 2024/0039840 A1* | 2/2024 | Frasier | H04L 45/03 |
| 2024/0143324 A1* | 5/2024 | Cronin | G06F 9/30021 |
| 2024/0275718 A1* | 8/2024 | Cronin | H04L 45/42 |
| 2025/0047593 A1* | 2/2025 | Vafai | H04L 45/306 |
| 2025/0062985 A1* | 2/2025 | Birmiwal | H04L 41/0894 |

FOREIGN PATENT DOCUMENTS

| | | | | |
|---|---|---|---|---|
| EP | 4414867 A1 * | 8/2024 | ......... | H04L 63/0263 |
| EP | 4510519 A1 * | 2/2025 | ............. | H04L 45/02 |

* cited by examiner

*Primary Examiner* — Kostas J Katsikis
(74) *Attorney, Agent, or Firm* — Fountainhead Law Group, PC

(57) ABSTRACT

The present disclosure is directed to routing control functions (RCF functions) and in particular to determining applicability of an RCF function at the time the function is configured in a network device. The determination is made in terms of the attributes referenced in the function and the attributes associated with the point of application (POA) of the function. The attributes at a given POA can differ from one POA to another. An RCF function written for one POA may not be applicable at another POA.

20 Claims, 8 Drawing Sheets

```
function my_rcf() {
    ..
    // code for RCF function "my_rcf"
    if prefix match prefix_list_v4 MY_PFX_LIST {
        return check_ext_comm();
    } else {
        return false;
    }
    ..
} function check_ext_comm() {
    return ext_community is { ROUTE-TARGET-AS:1:100 };
}
```

FIG. 4

DETERMINING APPLICABILITY OF ROUTING CONTROL FUNCTION AT POINT OF APPLICATION

BACKGROUND

Routing policies in a network device (e.g., switch, router, etc.) can specify which network routes are programmed into its routing tables and conversely how those routes are advertised to its neighbors. Users can create routing policies using tools called route maps which comprise route map commands to configure routes such as permitting or denying routes, modify routes, perform conditional actions, and so on. A common routing protocol is Border Gateway Protocol (BGP), a known and well understood protocol that is used by edge devices at the edge (entry/exit point) of a network core to exchange routing and reachability information with other edge devices (BGP neighbors) at the edges of other network cores.

Routing Control Function (RCF) is a routing policy technology that is developed and sold/licensed by Arista Networks, Inc. of Santa Clara, California. RCF is described in commonly owned U.S. Pub. No. US 2023/0038824, entitled "Efficient Runtime Evaluation Representation, External Construct Late-binding, and Updating Mechanisms For Routing Policies," the content of which is incorporated herein by reference in its entirety for all purposes. RCF is a programming tool that allows the user to define functions (referred to as policy functions) to programmatically evaluate network routes for route filtering, modification of route attributes, and the like. Users (e.g., network or system administrators) can write policy functions that express and evaluate policies such as route filtering and attribute modification in a programmatic fashion to facilitate processing of routes. Common multi-line policy directives that may occur in multiple places in a routing policy can be replaced by discrete RCF policy functions to improve readability, support, and maintenance. RCF can be used with protocols in addition to BGP, such as Routing Information Protocol (RIP), Interior Gateway Routing Protocol (IGRP), Open Shortest Path First (OSPF), Exterior Gateway Protocol (EGP), Enhanced Interior Gateway Routing Protocol (EIGRP), Intermediate System-to-Intermediate System (IS-IS), and others.

BRIEF DESCRIPTION OF THE DRAWINGS

With respect to the discussion to follow and in particular to the drawings, it is stressed that the particulars shown represent examples for purposes of illustrative discussion, and are presented in the cause of providing a description of principles and conceptual aspects of the present disclosure. In this regard, no attempt is made to show implementation details beyond what is needed for a fundamental understanding of the present disclosure. The discussion to follow, in conjunction with the drawings, makes apparent to those of skill in the art how embodiments in accordance with the present disclosure may be practiced. Similar or same reference numbers may be used to identify or otherwise refer to similar or same elements in the various drawings and supporting descriptions. In the accompanying drawings:

FIG. 4 represents an example of a nested function call.

DETAILED DESCRIPTION

The present disclosure is directed to RCF functions, and in particular to determining applicability of an RCF function at the time the function is configured in a routing policy on a network device. An RCF function is deemed applicable with respect to its point of application (POA) in the routing policy in terms of the route attributes referenced in the function. An RCF function written for one POA may not be applicable (or valid) at another POA. For example, an RCF function written for BGP may reference BGP route attributes and is applicable at a POA for BGP routes. However, that same function would not be applicable at a POA for OSPF routes because the BGP attributes referenced in the RCF function would not be applicable to OSPF routes.

Aspects of the present disclosure generally include informing the user in response to detecting that an RCF function is not applicable when it is specified at a given POA, allowing the user to take corrective action before installing the function in the network device. Providing users with this capability can significantly improve routing policy configuration by reducing the likelihood of misconfiguring the policy with incorrect RCF functions and hence reducing the impact in a production network due to a misconfigured device. In accordance with aspects of the present disclosure, applicability of an RCF function can be evaluated at the time the function is applied at a POA, or when an RCF function that is already specified at a POA has been edited and is no longer applicable at that POA because of the edits.

In the following description, for purposes of explanation, numerous examples and specific details are set forth in order to provide a thorough understanding of embodiments of the present disclosure. Particular embodiments as expressed in the claims may include some or all of the features in these examples, alone or in combination with other features described below, and may further include modifications and equivalents of the features and concepts described herein.

Figure 1:
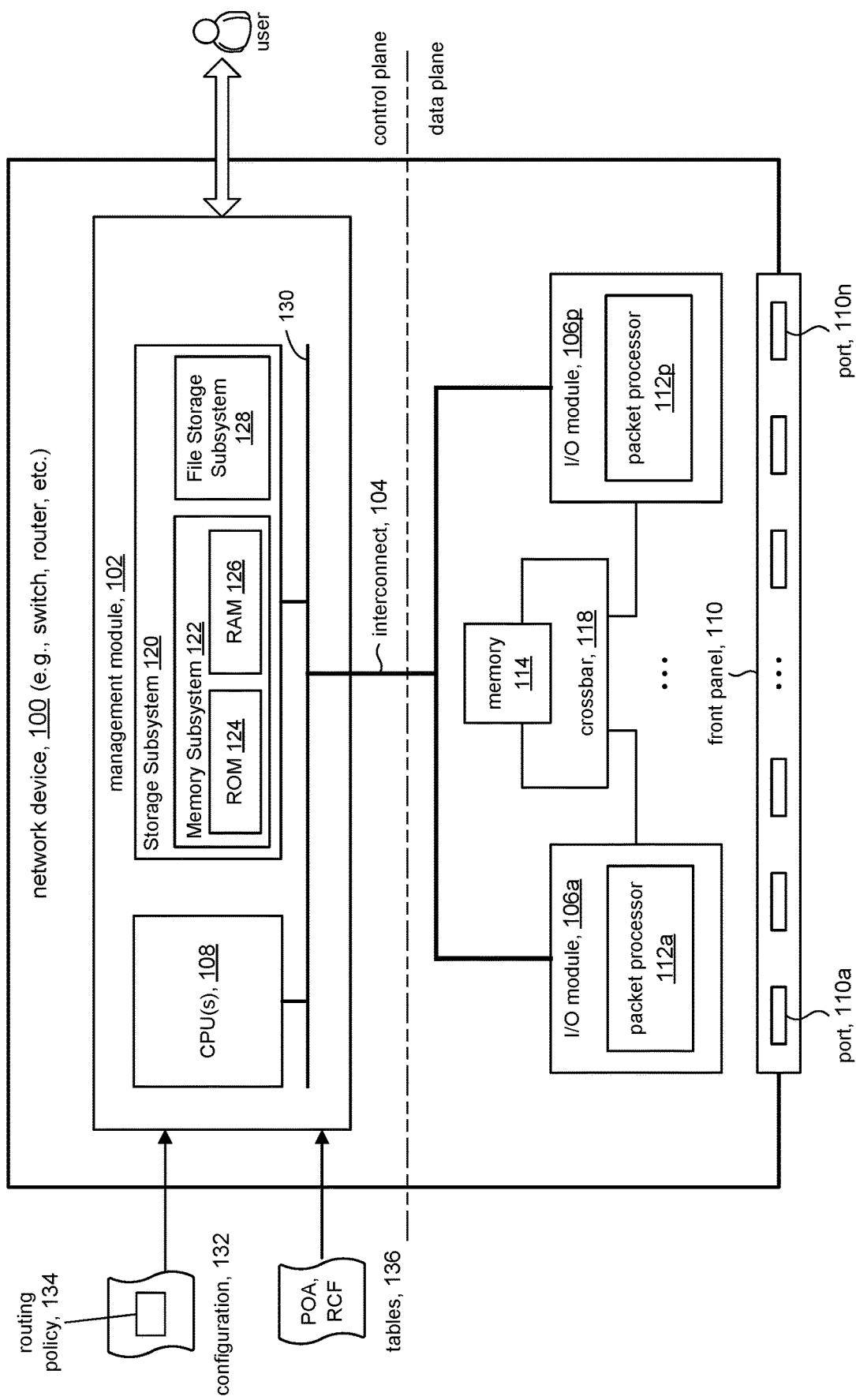
FIG. 1 is high level representation of a network device in accordance with the present disclosure.

FIG. 1 is a schematic representation of a network device 100 (e.g., a router, switch, edge device, firewall, and the like) that can be adapted in accordance with the present disclosure. In some embodiments, network device 100 can include a management module 102, one or more I/O modules (switches, switch chips) 106a-106p, and a front panel 110 of I/O ports (physical interfaces, I/Fs) 110a-110n. Management module 102 can constitute the control plane of network device 100 (also referred to as a control layer or simply the CPU), and can include one or more management CPUs 108 for managing and controlling operation of network device 100 in accordance with the present disclosure. Each management CPU 108 can be a general-purpose processor, such as an Intel®/AMD® x86, ARM® microprocessor, and the like, that operates under the control of software stored in a memory device/chips such as ROM (read-only memory) 124 or RAM (random-access memory) 126. The control plane provides services that include traffic management functions such as routing, security, load balancing, analysis, and the like.

The one or more management CPUs 108 can communicate with storage subsystem 120 via bus subsystem 130. Other subsystems, such as a network interface subsystem (not shown in FIG. 1), may be on bus subsystem 130. Storage subsystem 120 can include memory subsystem 122 and file/disk storage subsystem 128. Memory subsystem 122 and file/disk storage subsystem 128 represent examples of non-transitory computer-readable storage devices that can store program code and/or data, which when executed by one or more management CPUs 108, can cause one or more management CPUs 108 to perform operations in accordance with embodiments of the present disclosure.

Memory subsystem 122 can include a number of memories such as main RAM 126 (e.g., static RAM, dynamic RAM, etc.) for storage of instructions and data during program execution, and ROM (read-only memory) 124 on which fixed instructions and data can be stored. File storage subsystem 128 can provide persistent (i.e., non-volatile) storage for program and data files, and can include storage technologies such as solid-state drive and/or other types of storage media known in the art.

Management CPUs 108 can run a network operating system stored in storage subsystem 120. A network operating system is a specialized operating system for network device 100. For example, a suitable network operating system is the Arista EOS® operating system, which is a fully programmable and highly modular, Linux-based network operating system developed and sold/licensed by Arista Networks, Inc. of Santa Clara, California. It is understood that other network operating systems may be used.

Bus subsystem 130 can provide a mechanism for the various components and subsystems of management module 102 to communicate with each other as intended. Although bus subsystem 130 is shown schematically as a single bus, alternative embodiments of the bus subsystem can utilize multiple buses.

The one or more I/O modules 106a-106p can be collectively referred to as the data plane of network device 100 (also referred to as data layer, forwarding plane, etc.). Interconnect 104 represents interconnections between modules in the control plane and modules in the data plane. Interconnect 104 can be a Peripheral Component Interconnect Express (PCIe) bus or any other suitable bus architecture (e.g., System Management Bus (SMBus), Inter-Integrated Circuit (I²C), etc.).

I/O modules 106a-106p can include respective packet processing hardware comprising packet processors 112a-112p to provide packet processing and forwarding capability. Each I/O module 106a-106p can be further configured to communicate over one or more ports 110a-110n on the front panel 110 to receive and forward network traffic. Packet processors 112a-112p can comprise hardware (circuitry), including for example, data processing hardware such as an application specific integrated circuit (ASIC), field programmable gate array (FPGA), processing unit, and the like, which can be configured to operate in accordance with the present disclosure. Packet processors 112a-112p can include forwarding lookup hardware such as, for example, but not limited to content addressable memory such as ternary CAMs (TCAMs) and auxiliary memory such as static RAM (SRAMs).

Memory hardware 114 can include the buffers used for queueing packets. I/O modules 106a-106p can access memory hardware 114 via crossbar 118. It is noted that in other embodiments, the memory hardware 114 can be incorporated into each I/O module. The forwarding hardware in conjunction with the lookup hardware can provide wire speed decisions on how to process ingress packets and outgoing packets for egress. In accordance with some embodiments, some aspects of the present disclosure can be performed wholly within the data plane.

Configuration 132 can be provided to network device 100 to configure various aspects of the network device; e.g., which users can log into the device, directory name server (DNS) configuration, protocol configuration, hardware configuration, and so on. In some embodiments, configuration 132 can include routing policy 134 which represents an organization's policy for how network routes (network paths) are to be treated in the organization within which the network device is deployed; e.g., determine egress interface, virtual local area network (VLAN) tag manipulation, etc.

POA and RCF tables 136 can be provided and stored in network device 100 to assess applicability of RCF functions in accordance with the present disclosure. These aspects of the present disclosure are discussed in more detail below.

Figure 2:
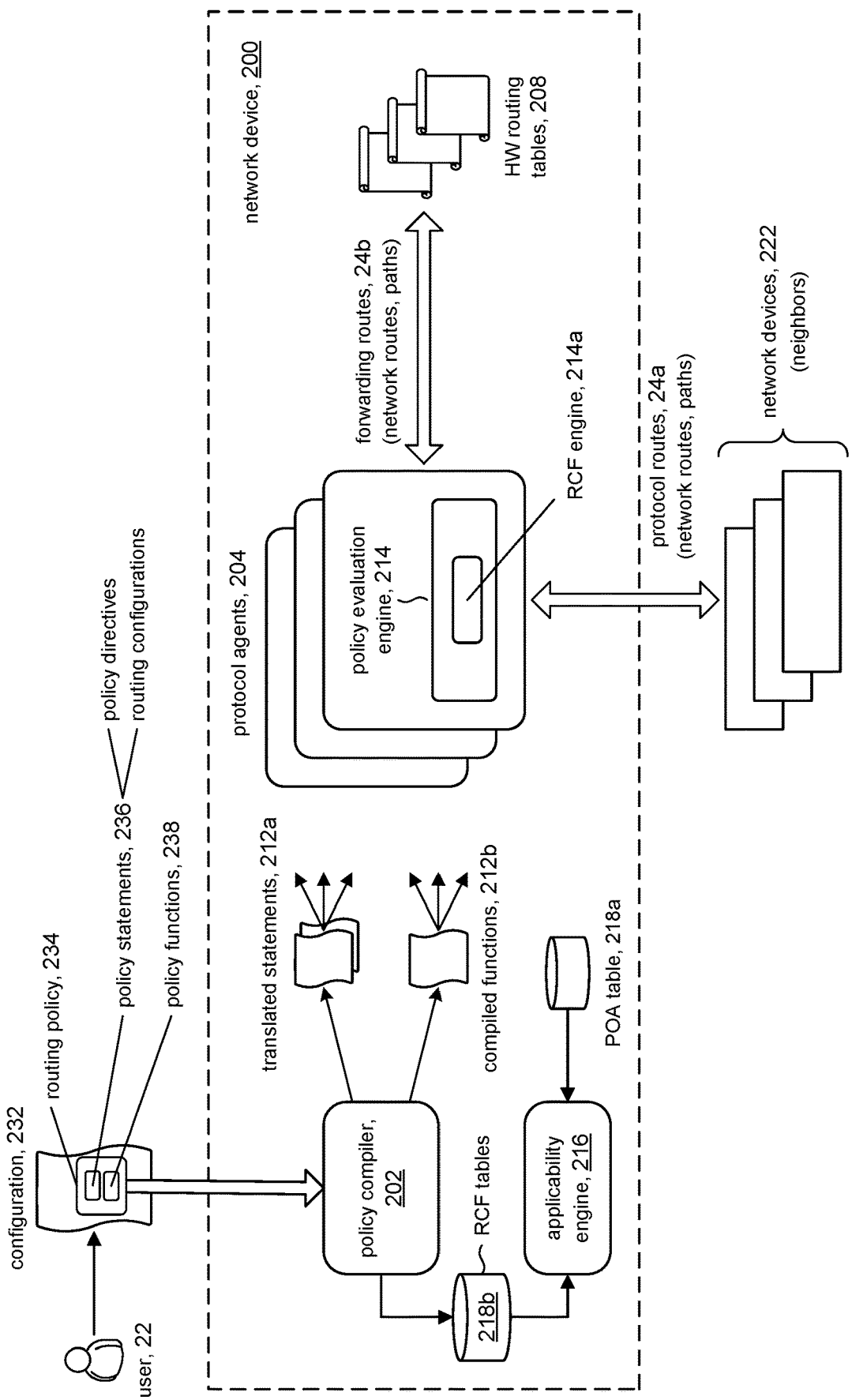
FIG. 2 represents an illustrative example of a production (live) execution environment.

FIG. 2 is a generalized schematic representation of a workflow in a network device for processing routes in accordance with the present disclosure. In some embodiments, for example, network device 200 can include policy compiler 202 to process a routing policy 234. A routing policy is used to assess or otherwise evaluate routing information that are exchanged among network devices in a network. Examples used in the present disclosure exchange routes using Border Gateway Protocol (BGP). It will be appreciated, however, that the present disclosure can be adapted for use with other routing protocols, for example, OSPF, IS-IS, and others.

The routing policy can be defined by a network administrator and is used to assess which BGP paths received from neighbor devices can be imported into the routing table(s) of a network device and, conversely, which BGP paths stored in the routing tables of the network device can be exported from the routing tables to neighbor devices.

In accordance with some embodiments, a routing policy 234 can include functions defined using the RCF programming language. Routing policy 234 can be contained in configuration file 232 which, for example, can be provided by a user 22, a centralized network controller, etc. Policy compiler 202 can include one or more components to compile or otherwise translate the user-readable text that constitutes routing policy 234 to a suitable internal representation that the network device can execute. A policy compiler in accordance with some embodiments is disclosed in commonly owned U.S. Pub. No. US 2023/0038824, entitled "Efficient Runtime Evaluation Representation, External Construct Late-binding, and Updating Mechanisms For Routing Policies," which is incorporated herein by reference for all purposes. Routing policy 234 can include routing policy statements 236 (e.g., policy directives, routing configurations, etc.) and routing control functions (referred to herein as policy functions) 238. In some embodiments, policy compiler 202 can include a translator to produce a suitable internal representation of the human-readable policy statements 236, and is generically represented in FIG. 2 as translated statements 212a, which can be executed by the network device.

In accordance with some embodiments, policy functions 238 can be written in the RCF programming language. Users (e.g., network or system administrators) can write policy functions that express and evaluate policies such as route filtering and modification of route attributes in a programmatic fashion to facilitate processing of routes. Policy compiler 202 can include a compiler to produce a suitable internal representation of policy functions 238, represented in FIG. 2 as compiled functions 212b (e.g., evaluation trees).

Network device 200 can include protocol agents 204 (e.g., spanning tree protocol, address resolution protocol, boundary gateway protocol, etc.) that communicate with other network devices 222 (neighbors, peers, etc.) in the network to exchange (import and export) protocol routes (or paths) 24a. Protocol agents 204 can execute the translated statements 212a and compiled functions 212b to assess or otherwise evaluate protocol routes 24a received from BGP neighbors 222. Depending on the evaluation, the network route can be programmed (imported) in the hardware routing tables 208 of the network device as forwarding routes or paths 24b. Conversely, the protocol agents 204 can assess forwarding routes 24b stored in the hardware routing tables 208 to be advertised (exported) to BGP neighbors 222. Hardware routing tables 208 can comprise any suitable persistent memory, such as TCAMs, SRAMs, etc. As used herein "route" and "path" will be used interchangeably.

Each policy agent 204 can include a policy evaluation engine 214. During processing of a received route 24a, 24b, the translated statements 212a and compiled functions 212b that constitute the routing policy are executed by the policy evaluation engine 214 to determine whether to accept (import) the received route or advertise (export) the received route. For example, routes 24a received from a neighbor device 222 can be assessed to determine if the received route is allowed to be imported (e.g., programmed) in a forwarding table of network device 200. Conversely, a route 24b in a forwarding table of the network device can be assessed to determine if the route can be exported (e.g. advertised) to neighbor devices 222. Policy evaluation engine 214 can create or otherwise represent an execution environment within which to execute the translated statements and compiled functions.

In accordance with some embodiments, the policy evaluation engine 214 can include or otherwise instantiate an RCF engine 214a that creates or otherwise represents an RCF execution environment for executing compiled functions 212b. The nature of the RCF execution environment depends on the nature of the particular implementation of RCF. In some embodiments, for example, RCF can be an interpreted language, not unlike the BASIC programming language, and RCF engine 214a can be an interpreter that interprets human-readable policy functions directly without compiling the functions. In other embodiments, RCF can be a partially compiled language. For example, policy functions can be compiled into an intermediate representation (e.g., bytecode) and RCF engine 214a can be an interpreter that interprets the intermediate representation. In some embodiments, the intermediate representation can be expressed as an evaluation tree, such as disclosed in commonly owned U.S. Pub. No. US 2023/0038824. In other embodiments, RCF can be compiled into binary code and RCF engine 214a can be a virtual machine that executes the binary code.

In accordance with some embodiments of the present disclosure, network device 200 can include an applicability assessment engine 216 and POA and RCF tables 218a, 218b. The applicability assessment engine 216 can determine the applicability of an RCF function that is configured at a POA using information stored in the POA and RCF tables 218a, 218b. These aspects of the present disclosure will now be described.

Figure 3:
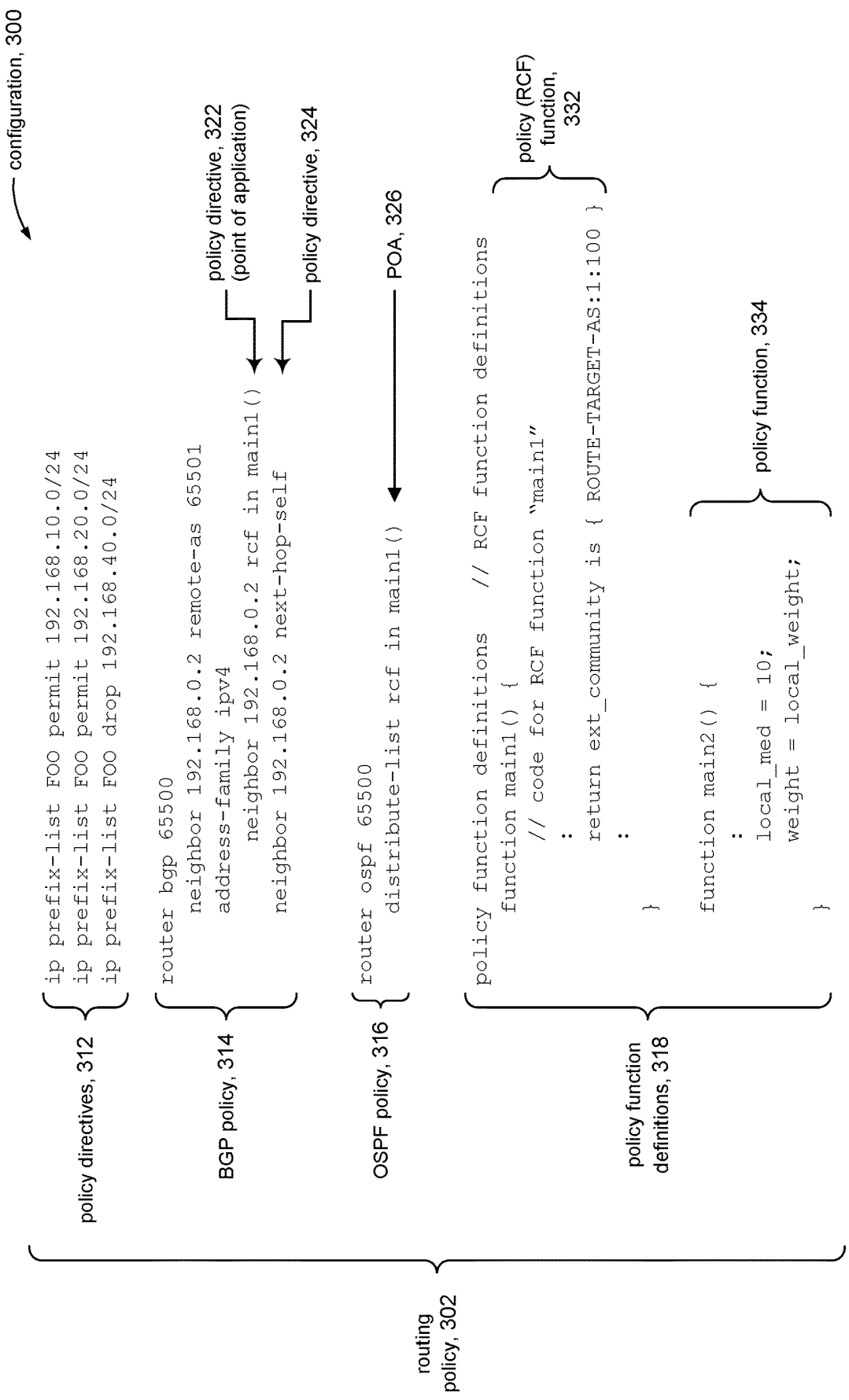
FIG. 3 is an illustrative example of a routing policy.

FIG. 3 shows a portion of a configuration 300 that includes a simplified example of a routing policy 302 in accordance with some embodiments. The illustrative routing policy 302 comprises policy directives 312, a BGP policy 314 for a BGP router, and an OSPF policy 316 for an OSPF router. The routing policy 302 includes a policy function definition section 318 comprising a policy function 332 called MAIN1( ).

The BGP policy 314 includes a directive 322 that invokes policy function 332. A policy directive (e.g., 322) that invokes a policy function can be referred to as the "point of application" (POA) of the policy function. When policy function MAIN1( ) is encountered at the point of application during execution (evaluation) of the BGP policy 314, the policy function is invoked and processing of the routing policy continues within the policy function. When execution of MAIN1( ) completes, processing can resume at a point in BGP policy 314 that follows the point of application 322 (i.e., execution transfers to the point in the routing policy 302 that follows the point of application), which in the example in FIG. 3 is policy directive 324.

Policy function 332 can be referred to as being specified at, applied or assigned to, or otherwise associated with a POA (i.e., at policy directive 322), and will be executed during execution of the routing policy 302. On the other hand, policy function 334 represents an example of a policy function that is not configured at any POA in the routing policy. As such, policy function 334 will not be executed during execution of the routing policy 302.

A policy function that is configured at a POA is deemed "applicable" to the POA when route attributes referenced in the policy function are route attributes associated with the POA. In FIG. 3, for instance, policy function 332 is deemed applicable at POA 322 in the BGP policy 314 because extended communities (the EXT_COMMUNITY attribute) is a route attribute (referred to herein simply as "attribute") that is relevant or applicable to the BGP protocol. So it would be appropriate to apply the policy function at a BGP POA such as POA 322. However, it would not be appropriate to apply policy function 332 at a POA for OSPF routes because OSPF routes do not have the concept of extended communities. FIG. 3 for example shows that policy function 332 is configured at POA 326 in the OSPF policy 316. Because extended communities are not used in OSPF routes, policy function 332 can be said to be "not applicable" when configured at POA 326.

Referring to FIG. 4, applicability (or non-applicability) of an RCF function can extend to nested functions. FIG. 4, for example, illustrates a code fragment example for an RCF function called MY_RCF( ) which includes a function call (nested function) to the RCF function CHECK_EXT_COMM( ). Assessing the applicability of an RCF function includes assessing RCF functions invoked by the top-level RCF function, assessing RCF functions called by those invoked functions, and so on.

Figure 5:
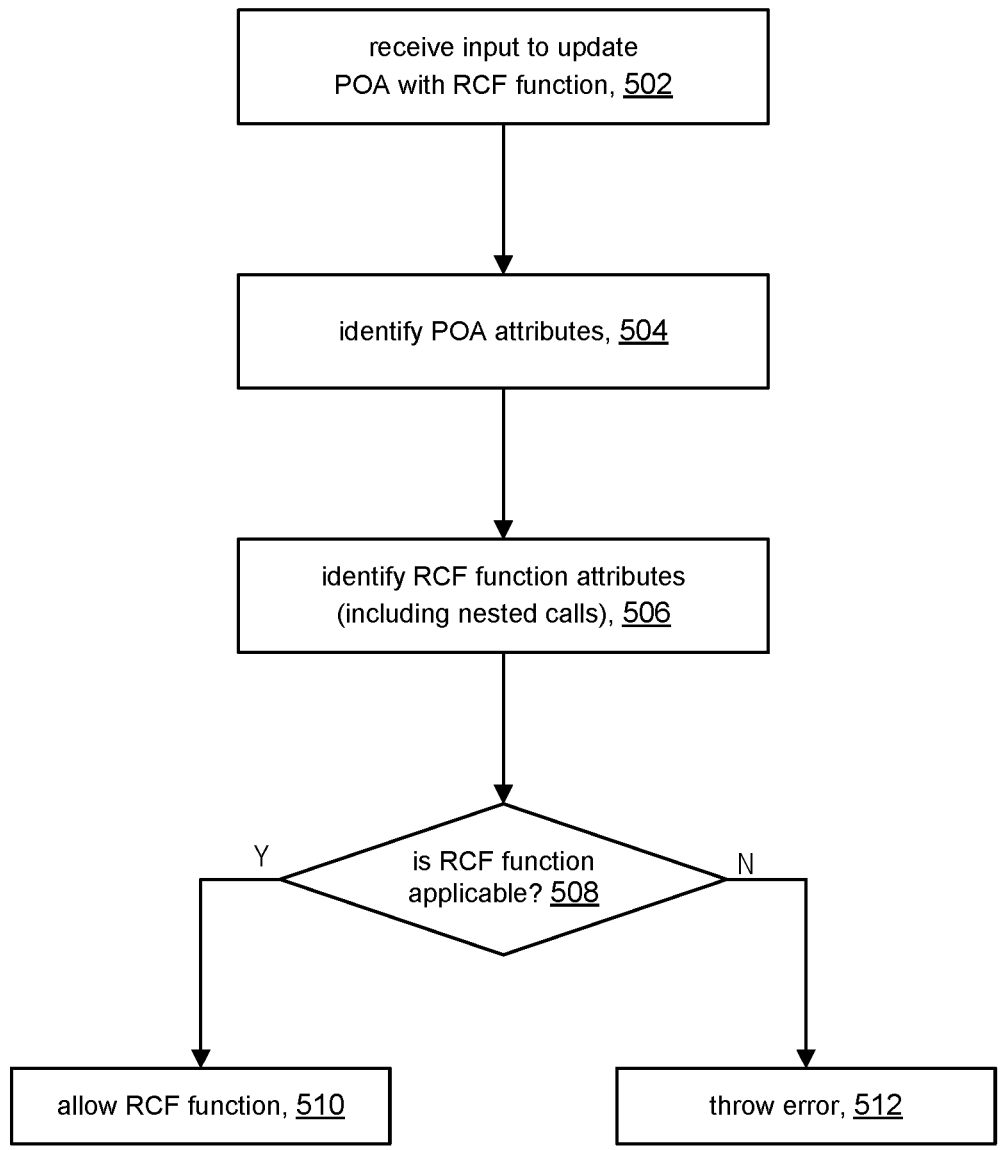
FIG. 5 illustrates a flow in accordance with some embodiments of the present disclosure.

Referring to FIG. 5, the discussion will now turn to a high-level description of processing in a network device (e.g., 100, FIG. 1) for assessing applicability (or non-applicability) of an RCF function in accordance with the present disclosure. Depending on a given implementation, the processing may be performed entirely in the control plane or entirely in the data plane of the network device, or the processing may be divided between the control plane and the data plane. In some embodiments, the network device can include one or more processing units (circuits), which when operated, can cause the network device to perform processing in accordance with FIG. 5. Processing units (circuits) in the control plane, for example, can include general CPUs that operate by way of executing computer program code stored on a non-volatile computer readable storage medium (e.g., read-only memory); e.g., CPU 108 in the control plane (FIG. 1) can be a general CPU. Processing units (circuits) in the data plane can include specialized processors such as digital signal processors, field programmable gate arrays, application specific integrated circuits, and the like, that operate by way of executing computer program code or by way of logic circuits being configured for specific operations. For example, each of the packet processors 112a-112p in the data plane (FIG. 1) can be a specialized processor. The operation and processing blocks described below are not necessarily executed in the order shown. Operations can be combined or broken out into smaller operations in various embodiments. Operations can be allocated for execution among one or more concurrently executing processes and/or threads.

At operation 502, the network device can receive input to update a POA in a routing policy with an RCF function. Generally speaking, in the context of the present disclosure, a POA can be "updated" by virtue of configuring the POA with an RCF function; e.g., POA 322 in FIG. 3 is configured with RCF function MAIN1( ). In some embodiments, for example, a user can configure a POA with an RCF function by assigning the RCF function at the POA via a command entered at a command line interface. Consider, for example the sequence of commands:

>>
>> router bgp 1
>> address-family IPv4
>> neighbor 1.1.1.1 rcf in my_rcf( )
>>
where ">>" is the command prompt
  "router bgp 1" specifies BGP protocol
  "address-family IPv4" specifies an address family
  "neighbor 1.1.1.1 rcf in my_rcf( )" specifies an action to assign the RCF function MY_RCF to the POA In the context of the present disclosure, a POA can also be "updated" by editing an RCF function that is already applied to the POA. Referring to FIG. 3, a user can edit the RCF function MAIN1( ), which is already applied to POA 322. The act of updating a POA with an RCF function, whether configuring the POA with the RCF function or editing an RCF function that is already configured at the POA, can serve to trigger assessing the applicability of the RCF function in accordance with the present disclosure.

At operation 504, the network device can identify POA attributes associated with the POA specified in the input received at operation 502. The routing policy that contains the POA is associated with a routing protocol, such as BGP, OSPF, IS-IS, etc. Each routing protocol, in turn, has route and route-related attributes that are relevant, specific, or otherwise applicable to that protocol. For example, POAs in a routing policy for BGP routes have attributes such as MED, LOCAL PREFERENCE, and ORIGIN. Likewise, POAs in a routing policy for IS-IS routes have attributes such as ADJACENCY, ATT, etc. In addition, different POAs within a given routing policy (e.g., a routing policy for BGP routes) can be defined with attributes that are specific to that POA.

Figure 6:
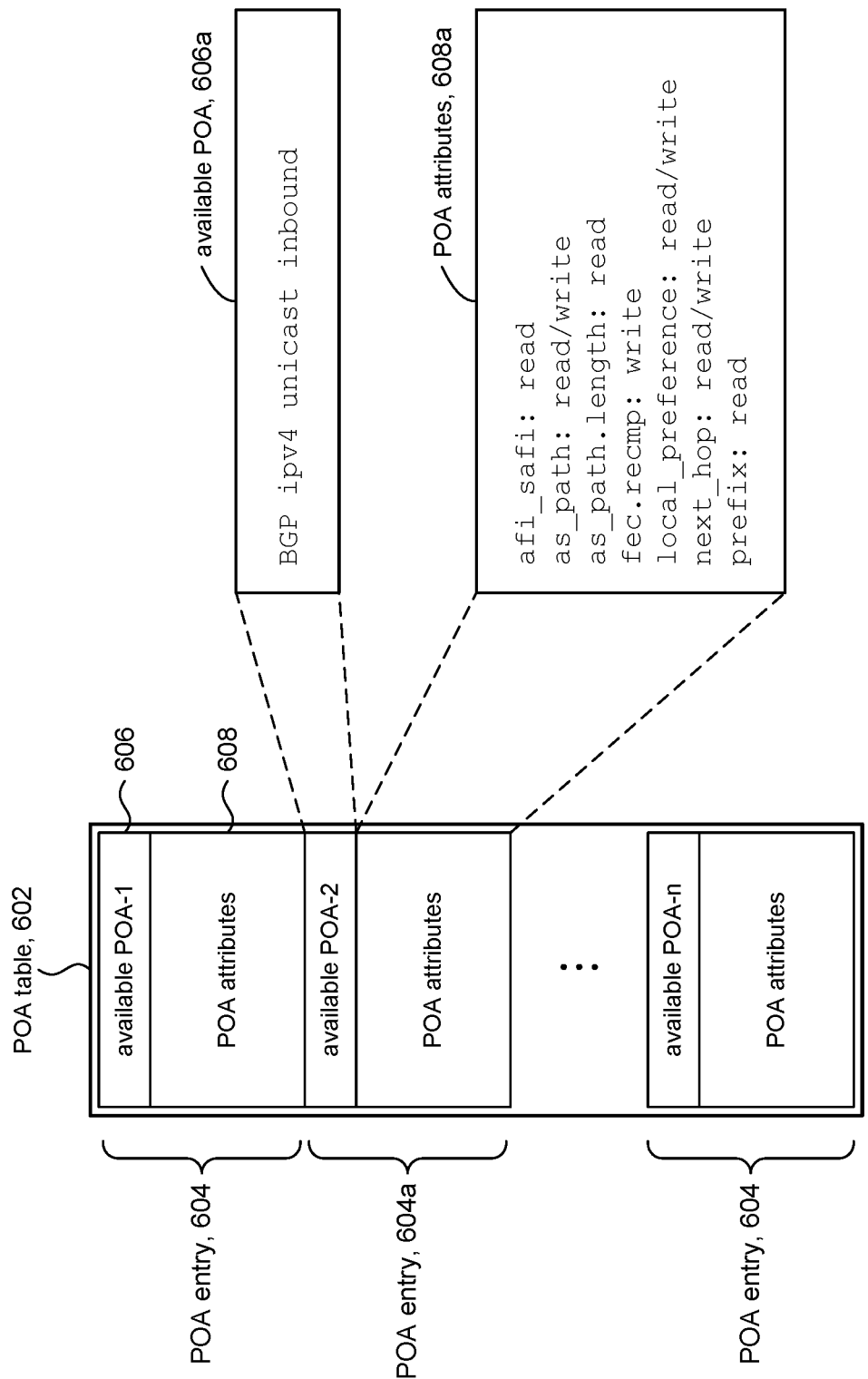
FIG. 6 illustrates an example point of application (POA) table in accordance with some embodiments of the present disclosure.

In some embodiments, the network device can store a POA table that lists available points of application (available POAs) for a routing policy where an RCF function can be applied. Each available POA is associated with a set of attributes (POA attributes) that are applicable at that POA, and which are available to an RCF function that is configured at that POA. FIG. 6, for example, shows an illustrative example of a POA table 602 in accordance with some embodiments. In some embodiments, for example, POA table 602 can comprise POA entries 604, one entry for each POA in the routing policy. Each POA entry 604 includes an available POA 606 that specifies the parameters of the POA. POA entry 604a, for example, represents an available POA 606a with parameters that specify a point of application for BGP IPv4 unicast protocols in the inbound direction. Each POA entry 604 further includes a set of POA attributes 608 that comprises the attributes of a given available POA. POA entry 604a, for example, shows the attributes that are applicable for available POA 606a.

In some embodiments, the points of application that are available for a routing policy in a network device can vary depending on the functionality of the network device; for example, if the network device supports only BGP then there would be no points of application for OSPF routes. Accordingly, the list of available POAs and corresponding applicable attributes can vary with each release of the controller software (e.g., firmware) for the network device, and can be preconfigured and programmed into the POA table 602 by the manufacturer.

Figure 7A:
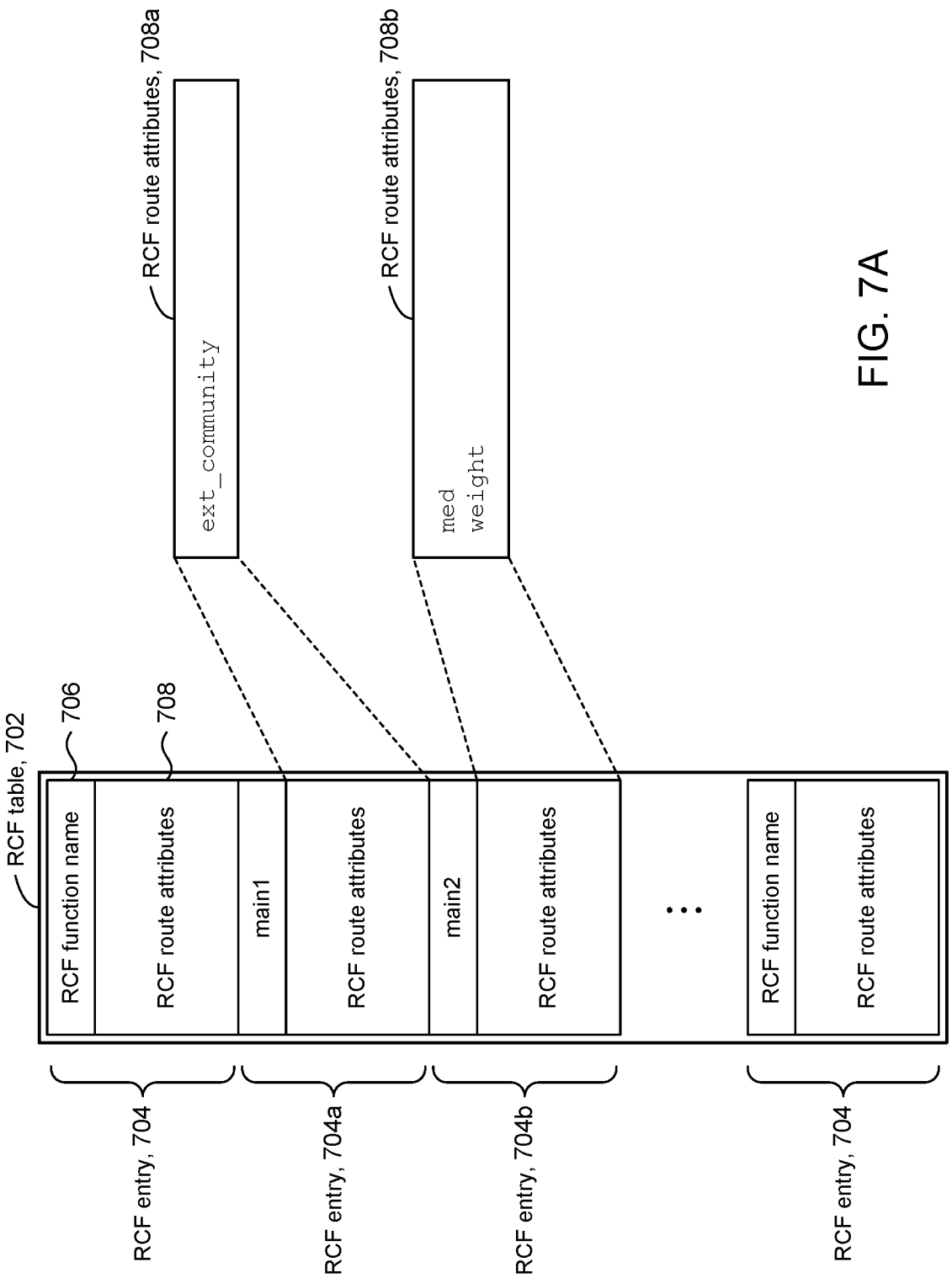
FIGS. 7A and 7B illustrate examples of an RCF table in accordance with some embodiments of the present disclosure.

Continuing with FIG. 5, at operation 506, the network device can identify attributes referenced in the RCF function that was specified at operation 502. In some embodiments, the network device can store an RCF table that contains sets of attributes (function attributes) referenced by each RCF function that is defined in the network device. FIG. 7A, for instance, shows an illustrative example of an RCF table 702 in accordance with some embodiments. RCF table 702 can comprise RCF entries 704, one entry for each RCF function. Each RCF entry 704 includes an RCF identifier 706 that identifies the RCF function. In some embodiments, for example, the RCF identifier can be the name of the RCF function. Each entry 704 further includes a set of RCF attributes 708 that comprises the attributes referenced in the corresponding RCF function. FIG. 7A shows illustrative examples of RCF entries 704a and 704b which correspond respectively to RCF functions 332 and 334 shown in FIG. 3; RCF function 332 is assigned to a POA and RCF function 334 is not assigned to a POA. Entry 704a is identified as MAIN1 (the name of RCF function 332) and includes the set of route attributes 708a that are referenced in the function. Likewise, entry 704b is identified as MAIN2 (the name of RCF function 334) and includes the set of route attributes 708b that are referenced in the function.

Figure 7B:
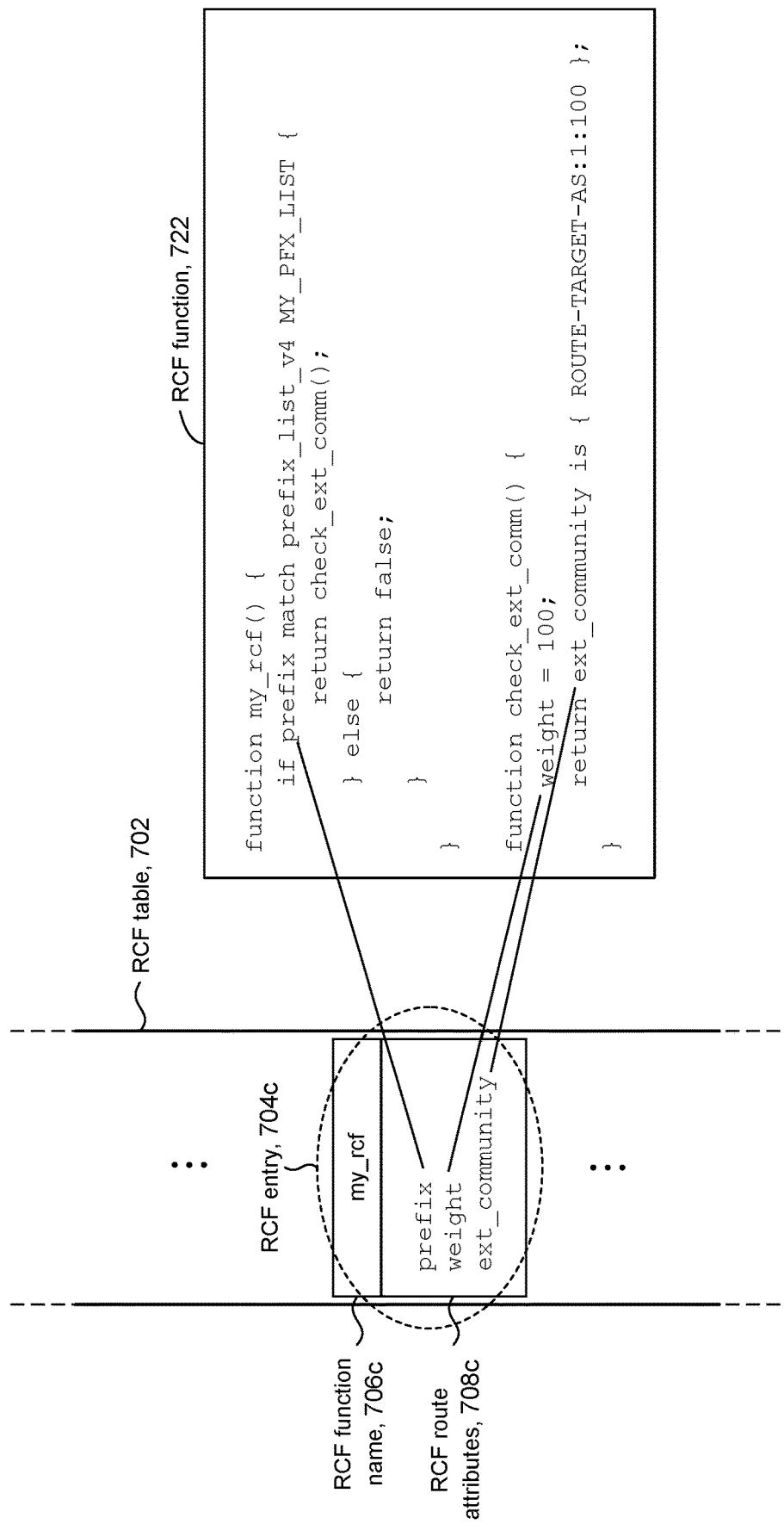

FIG. 7B shows an example of an RCF function 722 called MY_RCF( ). The RCF function includes a function call to the function CHECK_EXT_COMM( ). The corresponding RCF entry 704c for MY_RCF (top-level function) comprises an RCF function name data field 706c comprising the name MY_RCF. The route attributes data field 708c comprises the attributes referenced in MY_RCF and in the called function CHECK_EXT_COMM( ).

In some embodiments, the RCF table 702 can be populated during compilation of the RCF functions stored in the network device. In some embodiments, for example, the lexical scanner component of the compiler can be configured to recognize attribute names in addition to other program elements such as variable names, function names, operators, etc. For each RCF function encountered during compilation, the compiler can create an RCF entry 704 in the RCF table, populate the RCF function name data field 706, and populate the identified attributes in the RCF attributes data field 708. In the case where a user edits an RCF function (whether or not the function is applied at POA), the RCF table 702 can be updated when the user has completed their edits and the edited function is recompiled.

Returning to FIG. 5 and continuing at decision point 508, the network device can determine the applicability of the specified RCF function that is applied to the specified POA. If the RCF function is deemed to be applicable at the POA, then processing can continue at operation 510. If the RCF function is deemed to be inapplicable at the POA, then processing can continue at operation 512.

In some embodiments, for example, the determination of applicability (or inapplicability) can be made by comparing the set of POA attributes obtained at operation 504 with the set of RCF attributes obtained at operation 506. For example, the RCF function can be considered to be inapplicable at the POA if there is at least one RCF attribute that is not in the set of POA attributes. In other words, the RCF function includes one or more program statements that make reference to one or more attributes that are not associated with the POA to which the RCF function is applied. The program statement(s) can be any kind of programming construct such as an assignment statement, an IF statement, the argument in a function call, and so on. The RCF function is deemed inapplicable for that POA because execution of the program statement(s) can be indeterminate and can result in an error or unpredictable behavior, and even though such attributes may have "default" values, execution of the function can nonetheless cause unexpected results from the user's perspective.

In some embodiments, applicability of an RCF function that is specified at a POA can be based on whether a POA attribute is read-only or not and how that attribute is used in the RCF function. For example, if the POA attribute is read-only and the RCF function includes a program statement that writes to the attribute (e.g. in an assignment statement), the RCF function can be deemed inapplicable at the POA.

At operation 510, the network device can allow the specified RCF function to execute at the specified POA in response to a determination that the RCF function is applicable at the POA to which the function is assigned. In other words, the RCF function can be executed at the POA as part of processing a network route at the POA. The processing, for example, can include actions such as programming the network route in a forwarding table in the network device, advertising the route to neighbors of the network device, dropping the network route, and so on.

At operation 512, the network device can throw an error in response to a determination that the specified RCF function is not applicable at the specified POA to which the function is assigned. In some embodiments, error handling can include generating an error message to the user. The error message can identify the one or more attributes in the RCF function that are not supported at the POA. In other words, the error message can list one (or more) attributes from the set of RCF attributes 708 that are not in the set of POA attributes 608. In some embodiments, the error message can include a listing that shows which POAs the specified RCF function is applicable to, or conversely, the error message can include a listing that shows which RCF functions are applicable to the specified POA. In some embodiments, in addition to an error message, the network device can block an inapplicable RCF function from being configured at the POA. In other embodiments, the network may allow an inapplicable RCF function to nonetheless execute at the POA.

Further Examples

Features described above as well as those claimed below may be combined in various ways without departing from the scope hereof. The following examples illustrate some possible, non-limiting combinations:

(A1) A method for processing network routes in a network device, the method comprising: receiving input to update a point of application (POA) in a routing policy with a routing control function (RCF) function; identifying a POA entry in a table of POAs that corresponds to the POA in the routing policy, the identified POA entry comprising a plurality of route attributes associated with the POA ("POA attributes"); identifying an RCF entry in a table of RCF functions that corresponds to the RCF function, the identified RCF entry comprising a plurality of route attributes referenced in the RCF function ("function attributes"); in response, and subsequent, to a determination that the plurality of function attributes in the identified RCF entry are included in the plurality of POA attributes in the identified POA entry: receiving a network route; assessing the network route at the POA, including evaluating the network route by executing the RCF function configured at the POA; and performing an action on the network route according to an outcome of evaluation of the network route; and in response to a determination that the plurality of function attributes in the identified RCF entry are not all in the plurality of POA attributes in the identified POA entry: generating an error message indicating the RCF function is not applicable to the POA; and outputting the error message.

(A2) For the method denoted as (A1), the input specifies an action to assign the RCF function to the POA.

(A3) For the method denoted as any of (A1) through (A2), the RCF function has been previously assigned to the POA, wherein the input comprises one or more edit actions to the RCF function.

(A4) The method denoted as any of (A1) through (A3), further comprising, in response to a determination that the plurality of function attributes in the identified RCF entry are not all in the plurality of POA attributes in the identified POA entry, not allowing network routes to be assessed at the POA.

(A5) For the method denoted as any of (A1) through (A4), assessing the network route at the POA includes setting one or more of the plurality of POA attributes associated with the POA with properties of the received network route.

(A6) For the method denoted as any of (A1) through (A5), the function attributes of the RCF function and POA attributes of the POA are attributes of network routes.

(A7) For the method denoted as any of (A1) through (A6), the identified RCF entry includes function attributes of functions invoked by the RCF function.

(A8) For the method denoted as any of (A1) through (A7), the table of RCF functions is generated by compiling the RCF function.

(A9) For the method denoted as any of (A1) through (A8), the action includes one or more of programming the network route in a hardware table of the network device and advertising the network route to neighbor network devices.

(B1) A network device comprising: one or more computer processors; and a computer-readable storage device comprising instructions for controlling the one or more computer processors to: update a POA in a routing policy with an RCF function; evaluate applicability of the RCF function to the POA, including comparing a plurality of function attributes referenced in the RCF function with a plurality of POA attributes associated with the POA, wherein the RCF function is applicable to the POA when the plurality of function attributes is included in the plurality of POA attributes; when the RCF function is applicable to the POA, assess a received network route at the POA, including: executing the RCF function to process the received network route; and performing an action on the received network route according to an outcome of processing the received network route; and when the RCF function is not applicable to the POA: generate an error message indicating the RCF function is not applicable to the POA; and output the error message.

(B2) For the network device denoted as (B1), the update to the POA includes assigning the RCF function to the POA.

(B3) For the network device denoted as any of (B1) through (B2), the RCF is assigned to the POAs, wherein the update to the POA includes making one or more edits to the RCF function.

(B4) For the network device denoted as any of (B1) through (B3), the action includes programming the received network route in a hardware table of the network device.

(B5) For the network device denoted as any of (B1) through (B4), the action includes advertising the received network route to neighbor network devices.

(B6) For the network device denoted as any of (B1) through (B5), the RCF function includes program code that invokes another RCF function, wherein evaluating applicability of the RCF function to the POA includes evaluating applicability of the other RCF function to the POA.

(C1) A non-transitory computer-readable storage device in a network device, the non-transitory computer-readable storage device having stored thereon computer executable instructions, which when executed, cause the network device to: update a POA in a routing policy with an RCF function; evaluate applicability of the RCF function to the POA, including comparing a plurality of function attributes referenced in the RCF function with a plurality of POA attributes associated with the POA, wherein the RCF function is applicable to the POA when the plurality of function attributes is included in the plurality of POA attributes; when the RCF function is applicable to the POA, assess a received network route at the POA, including: executing the RCF function to process the received network route; and performing an action on the received network route according to an outcome of processing the received network route; and when the RCF function is not applicable to the POA: generate an error message indicating the RCF function is not applicable to the POA; and output the error message.

(C2) For the non-transitory computer-readable storage device denoted as (C1), the update to the POA includes assigning the RCF function to the POA.

(C3) For the non-transitory computer-readable storage device denoted as any of (C1) through (C2), the RCF is assigned to the POAs, wherein the update to the POA includes making one or more edits to the RCF function.

(C4) For the non-transitory computer-readable storage device denoted as any of (C1) through (C3), the action includes one or more of programming the received network route in a hardware table of the network device and advertising the received network route to neighbor network devices.

(C5) For the non-transitory computer-readable storage device denoted as any of (C1) through (C4), the RCF function includes program code that invokes another RCF function, wherein evaluating applicability of the RCF function to the POA includes evaluating applicability of the other RCF function to the POA.

The above description illustrates various embodiments of the present disclosure along with examples of how aspects of the present disclosure may be implemented. The above examples and embodiments should not be deemed to be the only embodiments, and are presented to illustrate the flexibility and advantages of the present disclosure as defined by the following claims. Based on the above disclosure and the following claims, other arrangements, embodiments, implementations and equivalents may be employed without departing from the scope of the disclosure as defined by the claims.

The invention claimed is:

1. A method for processing network routes in a network device, the method comprising:
   receiving input to update a point of application (POA) in a routing policy with a routing control function (RCF) function;
   identifying a POA entry in a table of POAs that corresponds to the POA in the routing policy, the identified POA entry comprising a plurality of route attributes associated with the POA ("POA attributes");
   identifying an RCF entry in a table of RCF functions that corresponds to the RCF function, the identified RCF entry comprising a plurality of route attributes referenced in the RCF function ("function attributes");
   in response, and subsequent, to a determination that the plurality of function attributes in the identified RCF entry are included in the plurality of POA attributes in the identified POA entry:
      receiving a network route;
      assessing the network route at the POA, including evaluating the network route by executing the RCF function configured at the POA; and
      performing an action on the network route according to an outcome of evaluation of the network route; and
   in response to a determination that the plurality of function attributes in the identified RCF entry are not all in the plurality of POA attributes in the identified POA entry:
      generating an error message indicating the RCF function is not applicable to the POA; and
      outputting the error message.

2. The method of claim 1, wherein the input specifies an action to assign the RCF function to the POA.

3. The method of claim 1, wherein the RCF function has been previously assigned to the POA, wherein the input comprises one or more edit actions to the RCF function.

4. The method of claim 1, further comprising, in response to a determination that the plurality of function attributes in the identified RCF entry are not all in the plurality of POA attributes in the identified POA entry, not allowing network routes to be assessed at the POA.

5. The method of claim 1, wherein assessing the network route at the POA includes setting one or more of the plurality of POA attributes associated with the POA with properties of the received network route.

6. The method of claim 1, wherein the function attributes of the RCF function and POA attributes of the POA are attributes of network routes.

7. The method of claim 1, wherein the identified RCF entry includes function attributes of functions invoked by the RCF function.

8. The method of claim 1, wherein the table of RCF functions is generated by compiling the RCF function.

9. The method of claim 1, wherein the action includes one or more of programming the network route in a hardware table of the network device and advertising the network route to neighbor network devices.

10. A network device comprising:
    one or more computer processors; and
    a computer-readable storage device comprising instructions for controlling the one or more computer processors to:

update a POA in a routing policy with an RCF function;
evaluate applicability of the RCF function to the POA,
including comparing a plurality of function attributes referenced in the RCF function with a plurality of POA attributes associated with the POA, wherein the RCF function is applicable to the POA when the plurality of function attributes is included in the plurality of POA attributes;
when the RCF function is applicable to the POA, assess a received network route at the POA, including:
executing the RCF function to process the received network route; and
performing an action on the received network route according to an outcome of processing the received network route; and
when the RCF function is not applicable to the POA:
generate an error message indicating the RCF function is not applicable to the POA; and
output the error message.

11. The network device of claim 10, wherein the update to the POA includes assigning the RCF function to the POA.

12. The network device of claim 10, wherein the RCF is assigned to the POAs, wherein the update to the POA includes making one or more edits to the RCF function.

13. The network device of claim 10, wherein the action includes programming the received network route in a hardware table of the network device.

14. The network device of claim 10, wherein the action includes advertising the received network route to neighbor network devices.

15. The network device of claim 10, wherein the RCF function includes program code that invokes another RCF function, wherein evaluating applicability of the RCF function to the POA includes evaluating applicability of the other RCF function to the POA.

16. A non-transitory computer-readable storage device in a network device, the non-transitory computer-readable storage device having stored thereon computer executable instructions, which when executed, cause the network device to:

update a POA in a routing policy with an RCF function;
evaluate applicability of the RCF function to the POA,
including comparing a plurality of function attributes referenced in the RCF function with a plurality of POA attributes associated with the POA, wherein the RCF function is applicable to the POA when the plurality of function attributes is included in the plurality of POA attributes;
when the RCF function is applicable to the POA, assess a received network route at the POA, including:
executing the RCF function to process the received network route; and
performing an action on the received network route according to an outcome of processing the received network route; and
when the RCF function is not applicable to the POA:
generate an error message indicating the RCF function is not applicable to the POA; and
output the error message.

17. The non-transitory computer-readable storage device of claim 16, wherein the update to the POA includes assigning the RCF function to the POA.

18. The non-transitory computer-readable storage device of claim 16, wherein the RCF is assigned to the POAs, wherein the update to the POA includes making one or more edits to the RCF function.

19. The non-transitory computer-readable storage device of claim 16, wherein the action includes one or more of programming the received network route in a hardware table of the network device and advertising the received network route to neighbor network devices.

20. The non-transitory computer-readable storage device of claim 16, wherein the RCF function includes program code that invokes another RCF function, wherein evaluating applicability of the RCF function to the POA includes evaluating applicability of the other RCF function to the POA.

* * * * *